US009349169B2

(12) United States Patent
Nguyen et al.

(10) Patent No.: US 9,349,169 B2
(45) Date of Patent: May 24, 2016

(54) SAMPLING-BASED MULTI-LATERAL FILTER METHOD FOR DEPTH MAP ENHANCEMENT AND CODEC

(71) Applicant: The Regents of the University of California, Oakland, CA (US)

(72) Inventors: Truong Nguyen, San Diego, CA (US); Kyoung-Rok Lee, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/389,619

(22) PCT Filed: May 17, 2013

(86) PCT No.: PCT/US2013/041642
§ 371 (c)(1),
(2) Date: Sep. 30, 2014

(87) PCT Pub. No.: WO2013/173749
PCT Pub. Date: Nov. 21, 2013

(65) Prior Publication Data
US 2015/0071526 A1    Mar. 12, 2015

Related U.S. Application Data

(60) Provisional application No. 61/648,168, filed on May 17, 2012.

(51) Int. Cl.
*G06K 9/00* (2006.01)
*G06T 5/10* (2006.01)
(Continued)

(52) U.S. Cl.
CPC . *G06T 5/10* (2013.01); *G06T 5/001* (2013.01); *G06T 5/20* (2013.01); *G06T 7/0051* (2013.01); *G06T 2207/10024* (2013.01); *G06T 2207/10028* (2013.01)

(58) Field of Classification Search
CPC ................................. G06T 5/10; G06T 7/0051
USPC ............................................. 382/154; 348/43
See application file for complete search history.

(56) References Cited

U.S. PATENT DOCUMENTS

| 2007/0024614 | A1 | 2/2007 | Tam et al. |
| 2010/0002948 | A1* | 1/2010 | Gangwal ............... G06T 7/0071 382/254 |
| 2010/0110070 | A1 | 5/2010 | Kim et al. |

FOREIGN PATENT DOCUMENTS

| RU | 2423018 C2 | 6/2011 |
| WO | 2009047681 A1 | 4/2009 |
| WO | 2011046607 A2 | 4/2011 |

OTHER PUBLICATIONS

Garcia et al: "A New Multi-lateral Filter for Real-Time Depth Enhancement", IEEE, 2011.*

(Continued)

*Primary Examiner* — Ruiping Li
(74) *Attorney, Agent, or Firm* — Greer, Burns & Crain, Ltd.

(57) ABSTRACT

A preferred method receives a color image and a corresponding raw depth map from a sensor or system. Unreliable regions are determined in the raw depth map by calculating pixel reliabilities for pixels throughout the depth map. Information is collected from the color image, for corresponding pixels in the unreliable regions of the raw depth map, from neighboring pixels outside the unreliable regions. The depth of pixels in the unreliable regions is updated with information collected from the reliable regions. Robust multi-later filtering is conducted on the adjusted depth map to produce an enhanced depth map.

18 Claims, 2 Drawing Sheets

(51) Int. Cl.
  *G06T 5/00* (2006.01)
  *G06T 5/20* (2006.01)
  *G06T 7/00* (2006.01)

(56) References Cited

OTHER PUBLICATIONS

Min, et al: "Depth Video Enhancement Based on Weighted Mode Filtering", IEEE, 2012.*

Chan, Derek, et al., "A Noise-Aware Filter for Real-Time Depth Upsampling", Workshop on Multi-camera and Multi-modal Sensor Fusion Algorithms and Applications-M2SFA2 2008, (2008) 12 pages.

Diebel, James, et al., "An application of markov random fields to range sensing", NIPS 2005, pp. 291-298.

Garcia, F., et al., "Pixel-weighted average strategy for depth sensor data fusion", 17th IEEE International Conference on Image Processing (ICIP) 2010, Sep. 2010, pp. 2805-2808.

Garcia, F., et al., "A new multi-lateral filter for real-time depth enhancement", 18th IEEE International Conference on Advanced Video and Signal-Based Surveilleance (AVSS) 2011, Sep. 2, 2011, pp. 42.47.

Gastal, Eduardo, et al., "Shared sampling for real-time alpha matting", Proceeding of Eurographics, Computer Graphics Forum, vol. 29, No. 2, May 2010, pp. 575-584.

Hirschmuller, et al., "Evaluation of cost functions for stereo matching", Computer Vision and Pattern Recognition, 2007, CVPR 2007, IEEE Conference, (2007), 8 pages.

Kopf, Johannes, et al., "Joint bilateral upsampling", ACM SIGGRAPH 2007, (2007), 5 pages.

Yang, Qingxiong, et al. "Spatial-depth super resolution for range images", IComputer Vision and Pattern Recognition, 2007, CVPR 2007, IEEE Conference, Jun. 2007, pp. 1-8.

* cited by examiner

SAMPLING-BASED MULTI-LATERAL FILTER METHOD FOR DEPTH MAP ENHANCEMENT AND CODEC

STATEMENT OF GOVERNMENT INTEREST

This invention was made with government support under grant no. CCF-1065305 awarded by the National Science Foundation. The government has certain rights in the invention.

FIELD

A field of the invention is video encoding and decoding, particularly in video+depth representation used in video encoding and decoding. Example applications of the invention include the encoding, storage, transmission, decoding and display of video data, including 3D video processing. Methods and codecs of the invention are particularly application to view synthesis for multi-view video, human computer interaction, augmented reality, 3D scene reconstruction, and any other application that makes use of a depth map.

BACKGROUND

Depth maps provide information for providing video data that extends beyond mere two-dimensional display. Various types of sensors are used to obtain depth maps. Example sensors include Time-of-Flight cameras (ToF), real-time infrared projectors and cameras (e.g. Microsoft Kinect), or stereo vision systems. Typically, the quality and resolution of the acquired depth information is not comparable to the analogous color images obtained from standard cameras. Hardware limitations and estimation errors are most often responsible for the lesser quality of the acquired depth information.

Others have considered ways to improve depth maps, most often through depth map upsampling and/or refinement. Most previous techniques suffer from artifacts, such as texture copying and edge blurring. Texture copying occurs in smooth areas with noisy depth data and textures in the color image, while edge blurring occurs in transition areas if different objects (located in different depth layers) have similar color. The following methods suffer from some or all of these drawbacks.

The seminal work in the study of the depth map upsampling problem is described by Diebel et al, "An application of Markov Random Fields to Range Sensing," NIPS pp. 291-298, MIT Press (2005). This technique assumes that discontinuities in range and color tend to co-align. The posterior probability of the high-resolution reconstruction is designed as a Markov Random Field (MRF) and it is optimized with the Conjugate Gradient (CG) algorithm.

Kopf et al described a technique known as Joint Bilateral Upsampling (JBU). See, "Joint Bilateral Upsampling," ACM SIGGRAPH '07 papers, New York, N.Y., USA, (2007). The Joint Bilateral Upsampligh approach leverages a modified bilateral filter. The technique upsamples a low-resolution depth by applying a spatial filter to it, while jointly applying a similar range filter on the corresponding high-resolution color image.

Yang et al. describe an upsampling method based on bilateral filtering the cost volume with sub-pixel estimation. See, Yang et al, "Spatial-Depth Super Resolution for Range Images," in Computer Vision and Pattern Recognition, CVPR '07. IEEE Conference on, June 2007, pp. 1-8. This technique builds a cost volume of depth probability and then iteratively applies a standard bilateral filter to it. A final output depth map is generated by taking the winner-takes-all approach on the weighted cost volume. Finally, a sub-pixel estimation algorithm is applied to reduce discontinuities.

The artifacts that can result in these approaches remain a concern. More recently, Garcia et al. have described a Pixel Weighted Average Strategy (PWAS) that seeks to resolve artifacts. See, Garcia et al, "Pixel Weighted Average Strategy for Depth Sensor Data Fusion," Image Processing (ICIP), 2010 17th IEEE International Conference, pp. 2805 2808 (September 2010). This weighted average strategy builds multi-lateral upsampling filters. The multi-lateral filters are an extended joint bilateral filter with an added credibility factor. The credibility factor takes into account the low reliability of depth measurements along depth edges and the inherent noisy nature of real-time depth data. As a further improvement upon PWAS, Adaptive Multi-lateral Filtering (AMF) has been described as improving accuracy within smooth regions. Garcia et al, "A New Multi-Lateral Filter for Real-Time Depth Enhancement," Advanced Video and Signal-Based Surveillance (AVSS), 2011 8th IEEE International Conference Sep. 2 2011, pp. 42 47. These weighted average methods solve the texture copying and edge blurring problems, but have performance that is very sensitive to the window size of the filter used, making the window size a critical parameter in application of the techniques. One filtering scheme is employed to enhance depth maps, and each depth value in the depth map is computed by averaging depth values from neighborhood with adaptive weights. With these methods, having a window size that is too large can cause boundary blurring and lose details of complex objects. On the other hand, having a window size that is too small can cause a failure to collect significant information from the neighborhood of the window. The sensitivity to window size will produce varied results depending upon the particular information obtained by the sensor when constructing a refined depth map, or requires additional complexity to determine and adapt the window size.

SUMMARY OF THE INVENTION

An embodiment of the invention is a method that receives a color image and a corresponding raw depth map from a sensor or system. Unreliable regions are determined in the raw depth map by calculating pixel reliabilities for pixels throughout the depth map. Information is collected from the color image, for corresponding pixels in the unreliable regions of the raw depth map, from neighboring pixels outside the unreliable regions. The depth of pixels in the unreliable regions is updated with information collected from the reliable regions. Robust multi-later filtering is conducted on the adjusted depth map to produce an enhanced depth map.

DETAILED DESCRIPTION OF THE PREFERRED EMBODIMENTS

Figure 1:
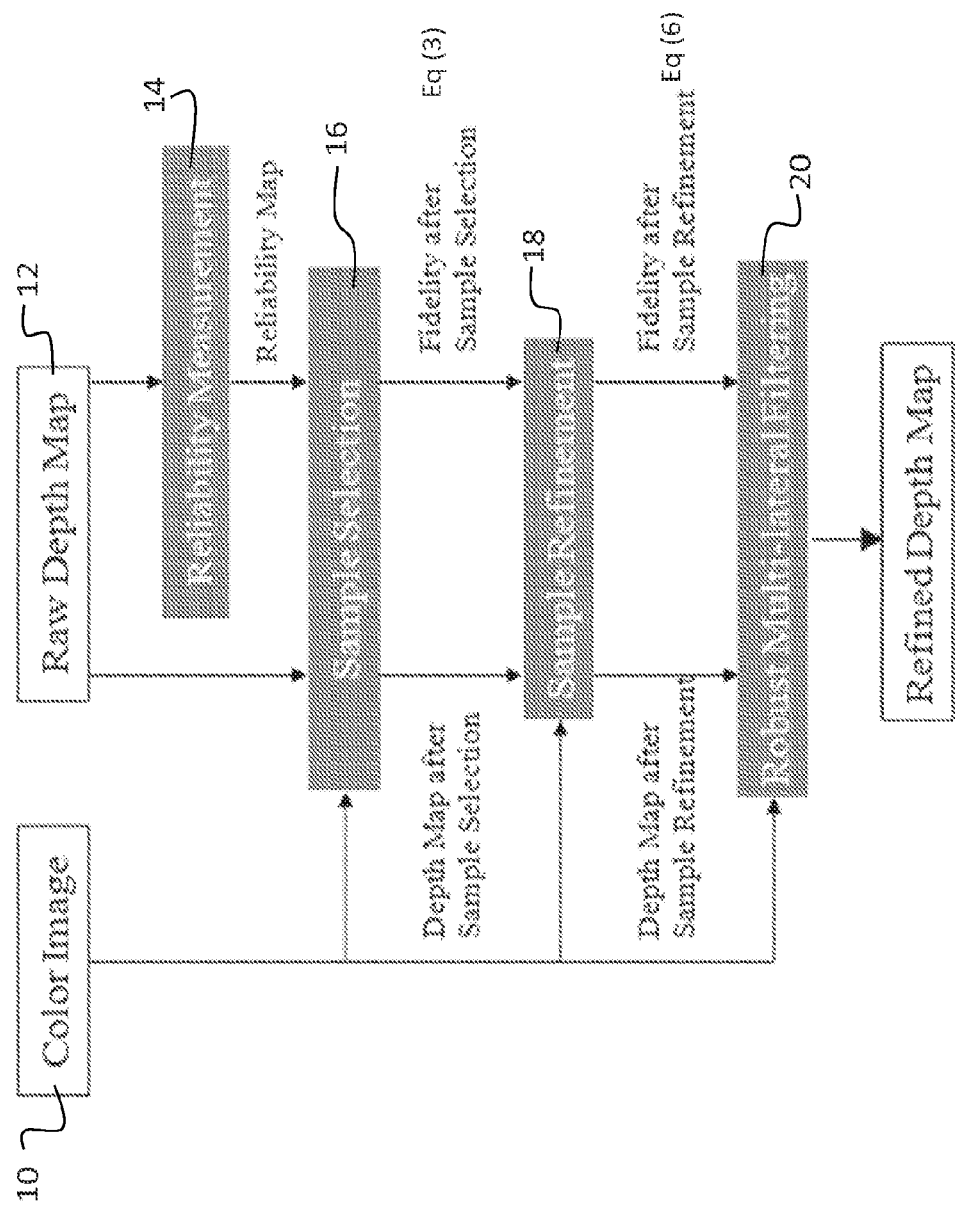
FIG. 1 is a flow chart illustrating a preferred method for sampling based multi-lateral filter depth map enhancement.

An embodiment of the invention is a method that enhances noisy or low-resolution depth maps using information from corresponding high-resolution color images. The method utilizes sample selection, preferably including sample refinement, in conjunction with multi-lateral filtering, derived from joint bilateral filtering using a new weighting metric. Experimental results verify that the method performs very well in comparison to existing methods known to the inventors.

A preferred embodiment depth map enhancement method is based on sample selection, subsequent selection refinement, and robust multi-lateral filtering. Depth samples are collected from a nearby reliable region. Each pixel shoots several rays toward reliable region and collects the closest samples. Then the samples are refined by comparing their own choice of best depth sample with the choices of their neighborhood. These are sampling-based approaches to improve depth map and do not contain the filtering method. Performance is insensitive to the window size. After the unreliable depth values are refined by the sample selection and refinement stages, a multi-lateral filter is applied with a robustness weight to reduce discontinuities in the final depth map. Since an initially refined depth map from a previous step is used as an input, better accuracy on boundaries is provided in the final result.

To the knowledge of the inventors, the sampling-based depth refinement is unique and provides performance advantages. Experiments have clearly showed that a preferred embodiment method significantly outperforms other state-of-the-art methods in the depth upsampling problem.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

A preferred method of the invention will be discussed with respect to FIG. 1. The method can be implemented, for example, via computer code stored on a non-transient medium. It can be implemented in hardware or firmware, and as a codec, in various video capture and processing devices. Example devices include augmented reality systems, human computer interaction devices, and gaming or entertaining devices such as Microsoft Kinect. The method of FIG. 1 begins with reception of a color image 10 I and a corresponding raw depth map D 12 from an appropriate sensor or another system. The method operates on a frame-by-frame basis, so the color image I and raw depth map D are considered as a single frame of video in the following discussion. The depth map D is provided by an appropriate sensor system, such as a time-of-flight camera or infrared projectors and cameras (e.g., Microsoft Kinect) and stereo vision systems. Unreliable regions are defined in the raw depth map by calculating 14 a measure of reliability for each pixel in the depth map D. The reliability is determined by calculating the sum of gradients for each pixel's neighborhood. Sample regions of low reliability are selected from the calculated reliabilities, and the remainder of the depth map is designated as a region of high reliability. Unreliable regions will be identified along edges of objects (transition areas in depth map). The width of the region is determined by a predetermined threshold ($\tau$ in Eq.2 below). With multiple objects, there will be multiple edges and can be separate distinct unreliable regions. Other reliability measurements can also be used to identify unreliable regions along object edges, for example, variance of pixels from neighboring pixels can be used as a reliability measurement.

Pixels existing along object edges in the regions of low reliability collect samples 16 from the region of high reliability and selects the best sample with the highest fidelity. Pixels with similar color tend to share similar depth values and if they are also spatially close, they are likely to have the same depth value. (Eq.3, fidelity function below provides a large response for collected depth sample which has a similar color and spatial proximity, but a value close to zero for the rest.) Each pixel's selected depth sample is refined 18 by sharing its information (choices of best depth sample and their fidelity values) with its neighbors' selected samples in the sample refinement stage. Finally, a robust multi-lateral filter, which is an extended joint bilateral filtering with an additional factor for robustness weights, is applied 20 to reduce noise while preserving sharpness along edges.

The calculating of reliability 14 to determine unreliable regions if preferably conducted by using the gradient of the depth map D is used as metric for measuring reliability of depth values based upon a reasoned assumption that depth values with high variance in their neighborhood or depth values along edges are not reliable. The derivative on the depth map is taken and its magnitude is calculated. Then, for each pixel, an average function of Gaussian of the gradient magnitude in a small window is computed. The window size can be set according to the magnitude of unreliability in the raw depth map. 3×3 and 5×5 windows were used in experiments. Larger windows are better when error is high and smaller windows are better when error is low. The reliability for each pixel can be defined as:

$$K_p = \sum_{q \in \Omega_p} f_t(|\nabla D_p|)/|\Omega_p| \qquad (1)$$

where $f_t$ is the Gaussian function with variance $\sigma_t$, $\Omega_p$, is the window centered at pixel p, and is the $\nabla$ gradient operation. The unreliable region $\Phi$ is the set of pixels whose reliability values are less than a certain threshold.

$$\Phi \leftarrow \{p | K_p < \tau\} \qquad (2)$$

The threshold $\tau$ controls the width of the unreliable region. The remaining pixels in the depth map are identified as the reliable region. In experiments, the fixed value (0.6) was used as a threshold for the Middlebury dataset. Every depth value in this unreliable region $\Phi$ will be updated and then refined by the following sample selection and refinement steps.

The collection of information from the color image 10 serves the purpose of identifying an appropriate sample in the depth map to use to update an unreliable pixel in the depth map. This is preferably conducted by identifying candidate depth samples from a nearby reliable region of the depth map. Specifically, an unreliable pixel in the depth map shoots several rays toward the reliable region of the depth map. The slope of each ray is given by $$\Theta, \Theta \leftarrow \left\{ \frac{j\pi}{\eta} \mid j = 0, 1, \ldots, 2\eta - 1 \right\}.$$

Figure 2:
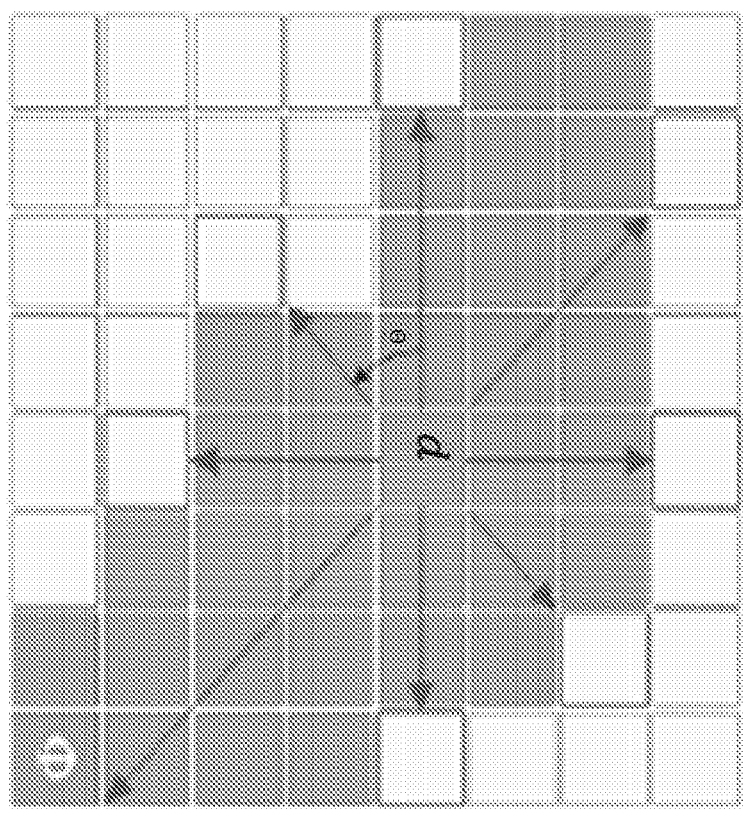
FIG. 2 illustrates sample selection conducted by a pixel determined to be in an unreliable region.

When the ray from p meets the reliable region, the closest corresponding depth sample is saved to $\Psi_p$. FIG. 2 illustrates rays (arrowed lines) and collected depth samples (squares with solid borders that are at arrow tips) for an unreliable pixel location p. This provides a number of candidate depth samples.

The best depth sample for pixel $p \in \Phi$ is obtained by calculating the fidelity for the candidate depth samples $\Psi_p$ from information collected from the color image. For every $i \in \Psi_p$, the fidelity function is computed based on the criteria that pixels with similar color tend to share similar depth values and that they are likely to have the same depth value if they are spatially close. Therefore, at a given candidate pixel p, the fidelity function can be computed as $$g^{SS}(p, i) = \sum_{q \in \Omega_p} f_r(|I_q - I_i|) f_s(\|q - i\|) / |\Omega p| \quad (3)$$

where $f_r$ and $f_s$ are taken to be Gaussian functions with standard deviations $\sigma_r$ and $\sigma_s$ respectively. $|I_q - I_i|$ is the color difference and $\Omega p$ is the window centered at pixel p. Errors can be suppressed from image noise caused by low lighting, high ISO settings, or chromatic distortion by taking into account the average of all pixels in a 3×3 window centered at pixel p.

Eq. (3) will have a large response for the depth value $d_i$ which has a similar color and spatial proximity, but a value close to zero for the rest. The sample selection selects the i* (the location of the depth sample which has largest fidelity value among collected depth samples) giving the largest fidelity value among depth samples:

$$i^* = \arg\max_{i \in \Psi_p} g^{SS}(p, i) \quad (4)$$

The selected depth and fidelity are saved for each pixel p∈Φ.

$$D_p^{SS} = D_{i^*},$$

$$E_p^{SS} = g^{SS}(p, i^*) \quad (5)$$

Sample refinement 18 uses the selected disparity map $D^{SS}$ and the fidelity map $E^{SS}$ to refine the sample selection for updating the depth map. The collection via the ray searching of FIG. 2 can occasionally fail to collect appropriate depths. For example, the desirable depth sample may be located between the rays or it may happen that the color affected by noise with a false depth sample is accidentally very similar to the target's color. The refinement 18 is helpful to further improve the depth map prior to filtering.

In the sample refinement 18, the samples are refined by comparing their own choice of best depth sample with the choices of their neighborhood. The design of the fidelity function for sample refinement is based on color fitness and spatial distance between pixel p and its neighbor q as well as q's fidelity value from the sample selection stage. The fidelity for sample refinement is determined by $$g^{SR}(p,q) = E_q^{SS} f_r(|I_p - I_q|) f_s(\|p - q\|) \quad (6)$$

Where $E_q^{SS}$ is the fidelity value of the pixel q from the previous stage as defined by Equation 5. q* is chosen to give the largest fidelity value among p's neighborhood:

$$q^* = \arg\max_{i \in \Omega_p} g^{SR}(p, q) \quad (7)$$

Similar to the sample selection stage, both refined depth value and fidelity are saved in the sample refinement.

$$D_p^{SR} = D_{q^*},$$

$$E_p^{SR} = g^{SR}(p, q^*) \quad (8)$$

Up to this point, we have estimated new depth values for pixels in the unreliable region. In the robust multi-lateral filtering 20, the refined depth data $D_p^{SR}$ will be used as an initial depth estimate and the fidelity values $E_p^{SR}$ will be used to determine the robustness factor.

The filtering 20 is conducted to reduce discontinuities in the refined depth map $D^{SR}$. The filtering 20 is an extended joint bilateral filtering technique, but a robustness factor is added to reduce blurring along edges as well as to refine edges. The robustness value for pixel p is determined by choosing the minimum value between $K_p$ and $E_p^{SR}$, which serves to disregard depth values with low plausibility as much as possible. This new weighting improves the filtering:

$$\tilde{K}_p = \min\{K_p, E_p^{SR}\} \quad (9)$$

With this robustness factor, the final depth is determined by $$D_p^{MF} = \frac{\sum_{q \in \Omega_p} f_r(|I_p - I_q|) f_s(\|p - q\|) \tilde{K}_q D_q^{SR}}{\sum_{q \in \Omega_p} f_r(|I_p - I_q|) f_s(\|p - q\|) \tilde{K}_q} \quad (10)$$

The spatial weighing term $f_r$ is based on pixel position and the range weight $f_s$ is based on color data. Thus, this filter adjusts the edges in the input depth map $D^{SR}$ to the edges in the guidance color image I and the robustness factor $\tilde{K}$ gives low weight to depth values with low fidelity, preventing artifacts such as texture copying and edge blurring. The result is the refined depth map $D^{MF}$.

Experimental Data

The preferred method was implemented in experiments, and demonstrated improved results. Specifically, the preferred method has been implemented with GPU programming and tested on computer with In Intel Corei7 CPU 2.93 GHz Processor and an NVIDIA GeForce GTX 460 graphics card. The performance speed of our method is on average 26 fps on a video with 640×480 resolution.

Qualitative and quantitative comparisons were conducted with respect to other existing methods. An improvement benchmark was demonstrated by applying the preferred refinement method to disparity estimation results from all of the 109 methods on the Middlebury stereo evaluation website.

For a quantitative comparison, the Moebius, Books, and Art scenes from the Middlebury datasets were used. The performance of the present method was measured against the state-of-the-art methods presented by F. Garcia et al, "A New Multi-Lateral Filter for Real-Time Depth Enhancement," in Advanced Video and Signal-Based Surveillance (AVSS), 2011 8th IEEE International Conference pp. 42 47 (Sep. 2 2011). Downsampled disparity maps are generated by downsampling the ground truth by a factor of 3×, 5×, and 9×. In Garcia et al, the structural similarity (SSIM) measure was used as a quantitative comparison. However, this measure is not appropriate for depth map evaluation because it does not function properly with disparities in unknown or occluded regions. Middlebury's ground truth maps contain regions of unknown disparity and depth upsampling algorithms do not produce meaningful results in those regions. As a fair comparison, we calculated the average percentage of bad pixels with an error threshold of 1 for all known regions. This is the same scoring scheme employed in the Middlebury evaluation. Table 1 show that our method performs better than all of the other methods (and images showed qualitative superiority as well).

| Dataset | | JBU | PWAS | AMF | Present Method |
|---|---|---|---|---|---|
| Moebius | 3x | 7.43 | 4.68 | 4.5 | 3.62 |
| | 5x | 12.22 | 7.49 | 7.37 | 4.87 |
| | 9x | 21.02 | 12.86 | 12.75 | 9.02 |
| Books | 3x | 5.4 | 3.59 | 3.48 | 2.38 |
| | 5x | 9.11 | 6.39 | 6.28 | 3.58 |
| | 9x | 15.85 | 12.39 | 12.24 | 7.11 |
| Art | 3x | 15.15 | 7.05 | 6.79 | 5.07 |
| | 5x | 23.46 | 10.35 | 9.86 | 6.91 |
| | 9x | 38.41 | 16.87 | 16.87 | 11.7 |

JBU: Joint Bilateral Upsampling
PWAS: Pixel Weighted Average Strategy
AMF: Adaptive Multi-lateral Filtering The experiments also applied the present refinement method to the disparity estimation results of all methods submitted to the Middlebury stereo evaluation. Resultant comparison images showed clear improvement in terms of the percentage of bad pixels. The present method will improve the results of most methods with respect to most images, its performance can drop with small and complex images or poorly estimated initial disparity maps.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for enhancing noisy or low-resolution image depth maps executed by computer code stored on a non-transient medium, the method comprising:
   receiving a color image I and a corresponding raw depth map D;
   determining unreliable regions in the raw depth map D by calculating pixel reliabilities for pixels throughout the depth map D;
   collecting from the color image I, for corresponding pixels in the unreliable regions of the raw depth map D, information from neighboring pixels outside the unreliable regions, wherein said collecting comprises having pixels shoot rays in a plurality of directions to outside an unreliable regions and choosing a pixel intersected by one of the rays based upon proximity and color similarity;
   adjusting depth of pixels in the unreliable regions with information collected in said step of collecting to produce an adjusted depth map $D^{SS}$;
   conducting multi-later filtering on the adjusted depth map to produce an enhanced depth map $D^{MF}$.

2. The method of claim 1, wherein said determining comprises calculating pixel reliability for every pixel in the raw depth map D.

3. The method of claim 2, wherein said collecting collects information for edge pixels in the unreliable regions.

4. The method of claim 1, wherein said determining comprises calculating the sum of gradients for a pixel's neighborhood and designating regions as unreliable that have pixels with high variance or are along an edge.

5. The method of claim 1, wherein said determining comprises measuring the gradient of the depth map D and using it to identify pixels in the depth map D having high variance in their neighborhood.

6. The method of claim 1, wherein said determining further comprises identify pixels along edges.

7. The method of claim 1, wherein said determining comprises calculating the reliability $K_p$ of pixels in the raw depth map according to:

$$K_p = \sum_{q \in \Omega_p} f_t(|\nabla D_p|)/|\Omega_p| \quad (1)$$

where $f_t$ is a Gaussian function with variance $\sigma_t$, $\Omega_p$ is a window centered at pixel p, and is the $\nabla$ gradient operation.

8. The method of claim 7, wherein the unreliable region $\Phi$ is the set of pixels whose reliability values are less than a predetermined threshold defined by $$\Phi \rightarrow \{p|K_p < \tau\} \quad (2)$$

where threshold $\tau$ controls the width of the unreliable region.

9. The method of claim 1, wherein said collecting further comprises generating a depth and fidelity map with pixels chosen from the rays based upon proximity and color similarity.

10. The method of claim 8, wherein the fidelity map is computed according to $$g^{SS}(p, i) = \sum_{q \in \Omega_p} f_r(|I_q - I_i|) f_s(\|q - i\|)/|\Omega p| \quad (3)$$

where $f_r$ and $f_s$ are taken to be Gaussian functions with standard deviations $\sigma_r$ and $\sigma_s$ respectively.

11. The method of claim 10, wherein the adjusted depth map $D^{SS}$ is produced by selecting the i* giving the largest fidelity value among depth samples:

$$i^* = \arg\max_{i \in \Psi_p} g^{SS}(p, i) \quad (4)$$

and the selected depth and fidelity are saved for each pixel $p \in \Phi$ $$D_p^{SS} = D_{i^*},$$

$$E_p^{SS} = g^{SS}(p, i^*) \quad (5).$$

12. The method of claim 11, further comprising a step of refining the adjusted depth map $D^{SS}$, wherein said refining is based on color fitness and spatial distance between pixel p and its neighbor q as well as q's fidelity value from Equation (5) and comprises determining fidelity of the adjusted depth map $D^{SS}$ according to $$g^{SR}(p,q) = E_q^{SS} f_r(|I_p - I_q|) f_s(\|p - q\|) \quad (6)$$

where $E_q^{SS}$ is the fidelity value of the pixel q as defined by Equation (5) and q* is chosen to give the largest fidelity value among p's neighborhood:

$$q^* = \arg\max_{q \in \Omega_p} g^{SR}(p, q) \quad (7)$$

and both refined depth value and fidelity are saved in the sample refinement according to:

$$D_p^{SS}=D_{q^*},$$

$$E_p^{SR}=g^{SR}(p,q^*) \quad (8).$$

13. The method of claim 12, wherein said conducting multi-lateral filtering comprises conducting joint bilateral filtering technique with edge blurring reduction and edge refining.

14. The method of claim 13, wherein said blurring reduction and edge refining are accomplished with a weighting factor that provides a value for pixel p is determined by choosing minimum value between $K_p$ and $E_p^{SR}$:

$$\tilde{K}_p=\min\{K_p,E_p^{SR}\} \quad (9)$$

with this weighting factor, the final depth is determined by $$D_p^{MF} = \frac{\sum_{q\in\Omega_p} f_r(|I_p - I_q|)f_s(\|p - q\|)\tilde{K}_q D_q^{SR}}{\sum_{q\in\Omega_p} f_r(|I_p - I_q|)f_s(\|p - q\|)\tilde{K}_q} \quad (10)$$

where the spatial weighing term $f_r$ is based on pixel position and the range weight $f_s$ is based on color data such that the filter adjusts edges in the refined depth map $D^{SR}$ to the edges in the guidance color image I and the weighting factor $\tilde{K}$ gives low weight to depth values with low fidelity, preventing artifacts such as texture copying and edge blurring to produce a refined depth map $D^{MF}$.

15. The method of claim 1, further comprising a step of refining said collecting, comprising comparing, for neighboring pixels, depth samples selected for neighboring pixels and replacing depth estimates when the comparison of a pixel indicates a better depth is available.

16. The method of claim 1, wherein the software is executed in hardware or firmware in a video capture or video processing device.

17. The method of claim 1, wherein the software is executed in a processor of an augmented reality system, human computer interaction device, gaming device, or entertainment device.

18. The method of claim 1, wherein the raw depth map D is provided by a time-of-flight camera, infrared projector and camera system, or a stereo vision system.

* * * * *